No. 683,512. Patented Oct. 1, 1901.
M. D. SNEAD.
CONVERTIBLE CORN AND COTTON PLANTER.
(Application filed Nov. 6, 1900.)
(No Model.) 2 Sheets—Sheet 1.
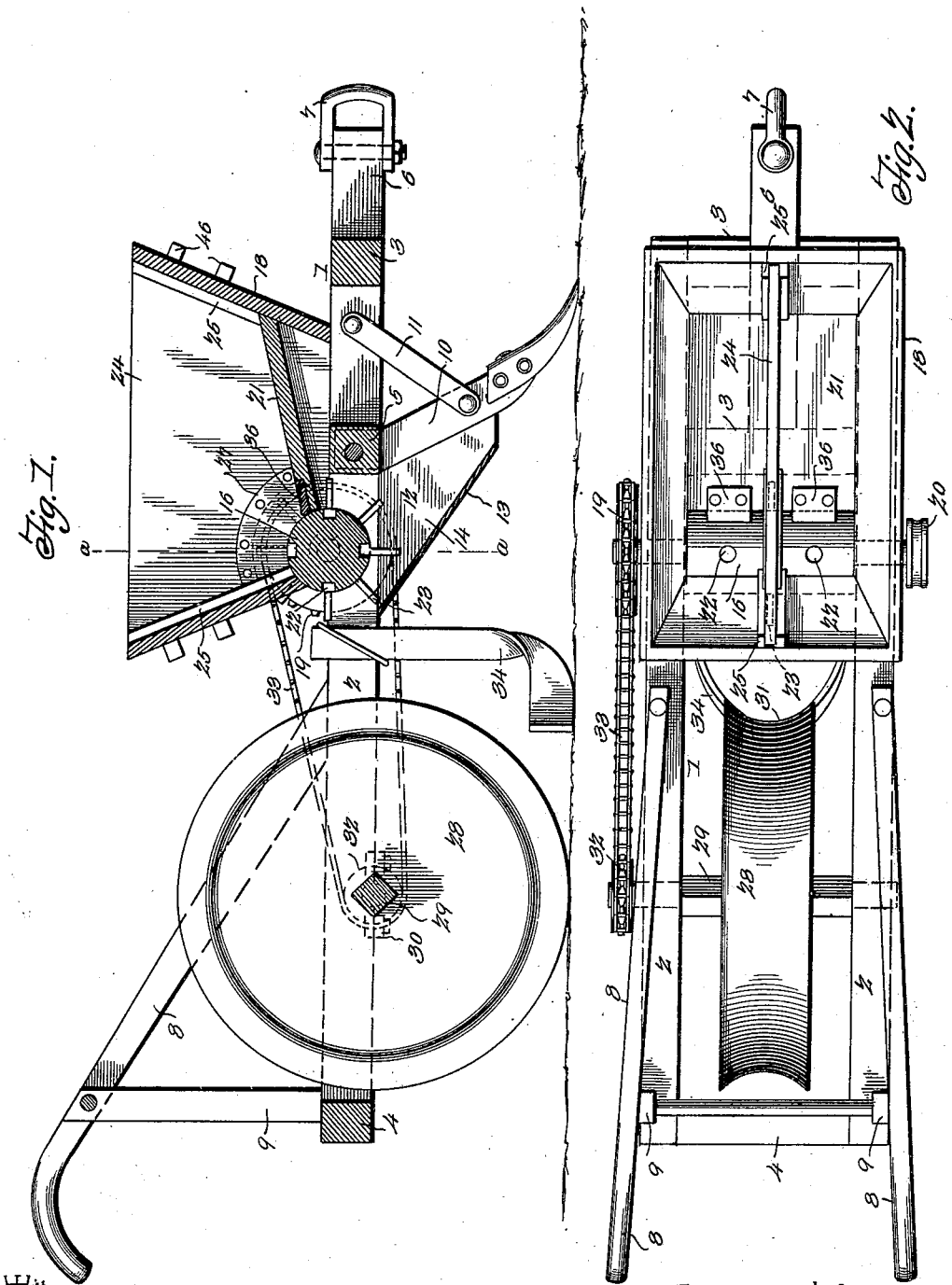
Witnesses
Inventor
M. D. Snead
by C. A. Snow & Co.
Attorneys No. 683,512. Patented Oct. 1, 1901.
M. D. SNEAD.
CONVERTIBLE CORN AND COTTON PLANTER.
(Application filed Nov. 6, 1900.)
(No Model.) 2 Sheets—Sheet 2.
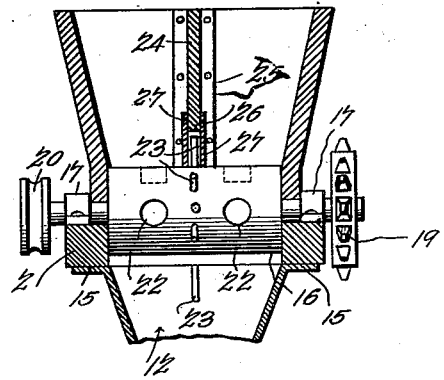
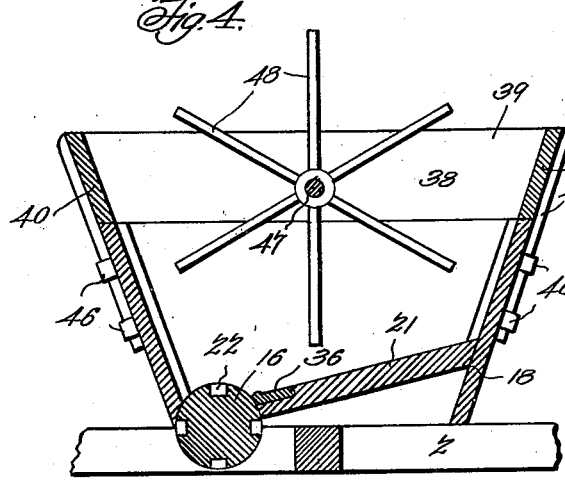
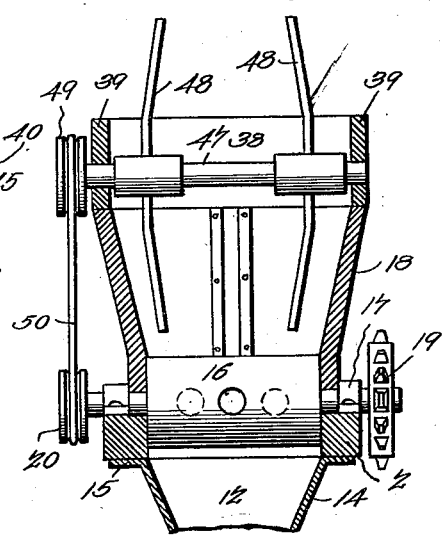

UNITED STATES PATENT OFFICE.

MIKE D. SNEAD, OF McKENZIE, TENNESSEE.

CONVERTIBLE CORN AND COTTON PLANTER.

SPECIFICATION forming part of Letters Patent No. 683,512, dated October 1, 1901.

Application filed November 6, 1900. Serial No. 35,687. (No model.)

*To all whom it may concern:*

Be it known that I, MIKE D. SNEAD, a citizen of the United States, residing at McKenzie, in the county of Carroll and State of Tennessee, have invented a new and useful Convertible Corn and Cotton Planter, of which the following is a specification.

My invention is an improved convertible corn and cotton planter; and one object of my invention is to effect improvements in the construction thereof whereby the same is also adapted to plant peas, beans, watermelon and other seeds, and to plant two kinds of seed, as corn and beans, either in the same hills or in alternate hills, and to adapt the machine also for planting seeds closely together, as in drills.

A further object of my invention is to simplify the construction of the planter and correspondingly reduce the cost of manufacturing the same, so that it may be sold at a low price.

My invention consists in the peculiar construction and combination of devices hereinafter fully set forth, and pointed out in the claims.

In the accompanying drawings, Figure 1 is a vertical longitudinal sectional view of a convertible planter constructed in accordance with my invention. Fig. 2 is a top plan view of the same. Fig. 3 is a detail sectional view of the same, taken on the line *a a* of Fig. 1. Fig. 4 is a detail longitudinal sectional view of a modified form of my invention. Fig. 5 is a detail transverse sectional view of the same.

The frame 1 of the machine comprises the side bars 2, a cross-bar 3, which connects the front ends thereof, a cross-bar 4, which connects the rear ends thereof, a cross-bar 5, which connects the side bars and is disposed at a suitable distance in rear of the cross-bar 3, and a draw-bar 6, which is disposed midway between the side bars 2, is secured on the central portions of the cross-bars 3 5, and projects for a suitable distance in front of the frame. A clevis 7 is attached to the front end of the draw-bar. Handles 8, which are of the usual construction, are secured on the side bars 2 and braced by standards 9.

A furrow-opening standard 10 is secured to the center of the cross-bar 5 and is braced by a bar 11, which extends therefrom to the draw-bar 6. Any suitable form of furrow-opening plow may be attached to the standard 10. The seed-spout 12 is formed of a sheet of metal bent to form the inclined rear side 13, the downwardly-converging sides 14, and the outturned horizontally-disposed flanges 15, which are secured under the side bars 2. The front sides of the sides 14 bear on opposite sides of the standard 10, which hence forms the front side of the said spout 12.

The seed-cylinder 16 is journaled in bearings 17 on the side bars 2, said seed-cylinder being disposed transversely in the frame 1 and above the spout 12. The spindles or shafts of the cylinder have extensions which project beyond opposite sides of the hopper 18. One of the extensions is provided with a sprocket-wheel 19 and the other is provided with a pulley 20.

The front, rear, and side walls of the seed-hopper converge downwardly, and the bottom 21 of the hopper inclines downward rearwardly. The seed-cylinder is disposed transversely of the seed-hopper in the rear side thereof, with the upper side of said seed-cylinder in the angle formed by the rear side wall and inclined bottom of the hopper. Hence the seeds in the seed-hopper will gravitate to the said seed-cylinder. The latter is provided with two series of seed-openings 22, the said series of seed openings or cups being disposed at appropriate distances from the ends of the seed-cylinder. The latter is provided at its center with a series of radially-disposed spurs 23, which are adapted to discharge cotton-seeds from the hopper into the furrow when the machine is employed for planting cotton. A longitudinally-disposed partition 24 in the center of the seed-hopper divides the same normally into two compartments, and said partition-board has its ends fitted in ways 25, formed between pairs of battens in the front and rear ends of the hopper. It will be observed by reference to Figs. 1, 2, and 3 of the drawings that the partition-board is disposed directly in line with the spurs 23. The lower rear corner of the partition-board is cut away, as at 26, to clear the said spurs, and metallic plates 27 are secured on opposite sides of said partition-board to cover the said spurs, as shown.

A traction supporting and covering wheel 28 has its shaft 29 journaled in bearings 30 near the rear ends of the side bars 2. The said wheel 28 has a concaved tread 31, which is adapted to cover the seed, the said wheel being in line with the furrow-opener and seed-spout 12. On one end of the shaft 29 is a sprocket-wheel 32, which is connected to the sprocket-wheel 19 by an endless sprocket-chain 33. Hence power is communicated to the seed-cylinder and the latter is caused to rotate, as will be understood. If desired, a pair of coverers 34 may also be employed in connection with the wheel 28, the standards of the said coverers being secured to the side bars 2 by clip-bolts, as shown in Fig. 1.

When the partition-board 24 is in place, as shown in Figs. 1, 2, and 3, seeds of one kind are placed in one of the compartments in the hopper and seeds of another kind are placed in the other compartment thereof. The seed cups or openings which operate in the respective compartments being appropriately disposed, the two kinds of seeds may be planted either simultaneously in the same hills or in alternate hills, or as otherwise desired. Plugs of suitable construction are employed in connection with the seed-cylinder for regulating the size of the seed-cups therein or for filling certain of the seed-cups, so as to reduce the number thereof which operate at each rotation of the seed-cylinder, and hence adapt the machine for planting hills at any required distance apart.

A seed-cylinder of any required diameter may be used and provided with appropriately-located seed-cups, and hence the machine may be adapted for planting seeds, as watermelon-seeds, in hills about twelve feet apart.

When the partition-board 24 is removed, the machine is adapted for planting cotton-seeds, the spurs being then uncovered and operating in the lower rear corner of the hopper and serving to feed the cotton-seeds from the hopper.

In connection with the bottom of the hopper, which bears against the front side of the seed-cylinder, I provide flexible cut-offs 36, which are made of rubber, leather, or other suitable material and are secured on the bottom of the hopper and bear against the front side of the seed-cylinder.

In Figs. 4 and 5 I illustrate a modified form of my invention in which the same is especially adapted for planting cotton-seeds. In this form of my invention the hopper is provided on its upper side with an extended section 38, which increases the capacity of the hopper, said extension comprising a pair of side boards 39 and a pair of end boards 40 and being secured on the hopper by standard-bars 45, which engage keepers 46, with which the hopper is provided. A shaft 47 has its bearings in the sides of the section 38 and is provided with a suitable number of radial stirring-spurs 48. One end of the shaft, which extends beyond one side of the section 38, is provided with a pulley 49, which is connected to the pulley 20, with which the shaft of the seed-cylinder is provided, by an endless belt 50. It will be understood that when thus organized the stirring-spurs 48 revolve in the hopper and prevent the cotton-seeds from lodging therein.

A convertible planter thus constructed is exceedingly cheap and simple, is entirely efficient in operation, and is adapted for planting seeds of various kinds.

Having thus described my invention, I claim—

1. In a convertible planter, the hopper having the removable longitudinally-disposed partition-board, the seed-cylinder having the spurs in the plane of the partition-board, and the seed-cups on opposite sides of said stirring-spurs, said removable partition-board being cut away on its lower side to clear said spurs, and having the plates secured on its sides to cover said spurs when the partition-board is in place in the hopper, and cut-offs to coact with those portions of the cylinder which are provided with the seed-cups, substantially as described.

2. A convertible planter having a hopper, a revoluble seed-cylinder having spurs and seed-cups on opposite sides of the spurs, cut-offs to coact with those portions of the cylinder having said seed-cups, means to open and close the latter and a removable partition to divide the hopper into compartments and to cover the spurs of the seed-cylinder, substantially as described.

3. A convertible planter having a hopper, a revoluble seed-cylinder having spurs and seed-cups, means to open and close the latter, and means to cover and uncover the said spurs, substantially as described.

In testimony that I claim the foregoing as my own I have hereto affixed my signature in the presence of two witnesses.

MIKE D. SNEAD.

Witnesses:
G. L. PRATT,
D. F. WREN.